United States Patent
Lorentz et al.

(10) Patent No.: US 11,218,004 B2
(45) Date of Patent: Jan. 4, 2022

(54) ARRANGEMENT HAVING A MULTIFUNCTIONAL CONNECTION FOR ENERGY STORAGE CELLS OR ENERGY CONSUMERS

(71) Applicant: FRAUNHOFER-GESELLSCHAFT ZUR FOERDERUNG DER ANGEWANDTEN FORSCHUNG E.V., Munich (DE)

(72) Inventors: Vincent Lorentz, Erlangen (DE); Martin Maerz, Nuremberg (DE); Martin Wenger, Erlangen (DE)

(73) Assignee: Fraunhofer-Gesllschaft zur Foerderung der angewandten Forschung e.V., Munich (DE)

( * ) Notice: Subject to any disclaimer, the term of this patent is extended or adjusted under 35 U.S.C. 154(b) by 573 days.

(21) Appl. No.: 16/301,467

(22) PCT Filed: May 16, 2017

(86) PCT No.: PCT/EP2017/061652
§ 371 (c)(1),
(2) Date: Nov. 14, 2018

(87) PCT Pub. No.: WO2017/198634
PCT Pub. Date: Nov. 23, 2017

(65) Prior Publication Data
US 2019/0131799 A1   May 2, 2019

(30) Foreign Application Priority Data

May 17, 2016   (DE) .................... 10 2016 208 420.8

(51) Int. Cl.
*H02J 7/00*   (2006.01)
*H02J 7/14*   (2006.01)
(Continued)

(52) U.S. Cl.
CPC ......... *H02J 7/0016* (2013.01); *H01M 10/425* (2013.01); *H01M 10/48* (2013.01);
(Continued)

(58) Field of Classification Search
USPC ........................................ 320/109
See application file for complete search history.

(56) References Cited

U.S. PATENT DOCUMENTS 4,879,188 A * 11/1989 Meinhold ............. H02J 7/0026
                                                               429/7
2007/0182371 A1   8/2007 Boebel ........................ 320/112
(Continued)

FOREIGN PATENT DOCUMENTS

| DE | 10 2009 000 504 A1 | 8/2010 | ............ H01M 10/48 |
| DE | 10 2012 205 553 A1 | 10/2013 | ............ H01M 2/34 |
| WO | WO 01/83182 A1 | 11/2001 | ............ C06B 45/12 |

OTHER PUBLICATIONS

International Search Report dated Jul. 18, 2017 in related application No. PCT/EP2017/061652.
(Continued)

*Primary Examiner* — Alexis B Pacheco
(74) *Attorney, Agent, or Firm* — Renner, Kenner, Greive, Bobak, Taylor & Weber

(57) ABSTRACT

An arrangement having a multifunctional connection for energy storage cells or energy consumers provides at least one device for charge equalization and/or a measuring device for measuring an electrical voltage of energy storage cells or energy consumers; an electrical bridging element between two electrically insulated conductors; and a trigger circuit for activating the bridging element. One of the two electrical conductors is connected or is connectable to a first pole in an electrically conductive manner, and the other electrical conductor is connected or connectable in an electrically conductive manner to a second pole of the energy (Continued)

storage cell or of the energy consumer. The device for charge equalization and/or the measuring device is connected to the electrical connection of the bridging element. The electrical connection can thus be used simultaneously for triggering the bridging element and for the charge measurement and/or the charge equalization.

15 Claims, 7 Drawing Sheets

(51) Int. Cl.
    *H01M 10/48* (2006.01)
    *H01M 50/572* (2021.01)
    *H01M 10/42* (2006.01)

(52) U.S. Cl.
    CPC ......... *H01M 50/572* (2021.01); *H02J 7/0021* (2013.01); *H02J 7/0026* (2013.01); *H01M 2010/4271* (2013.01)

(56) References Cited

U.S. PATENT DOCUMENTS

| | | | |
|---|---|---|---|
| 2010/0157495 A1 | 6/2010 | Densham | 361/56 |
| 2011/0003182 A1* | 1/2011 | Zhu | H01M 10/617 429/50 |
| 2011/0101920 A1* | 5/2011 | Seo | H01M 50/502 320/127 |
| 2012/0046892 A1* | 2/2012 | Fink | G01R 31/389 702/63 |
| 2013/0200852 A1* | 8/2013 | Song | H02J 7/0016 320/134 |
| 2013/0252039 A1* | 9/2013 | Vom Dorp | H01M 10/4207 429/61 |
| 2013/0320918 A1* | 12/2013 | Ohmer | B60L 58/19 320/107 |
| 2014/0217982 A1* | 8/2014 | Ohkawa | H02J 7/0014 320/118 |
| 2014/0354212 A1* | 12/2014 | Sugeno | B60L 58/12 320/103 |
| 2015/0380959 A1 | 12/2015 | Chang et al. | H02J 7/0019 |
| 2018/0246169 A1* | 8/2018 | Miura | H01M 10/425 |
| 2020/0259272 A1* | 8/2020 | Waller | H01M 50/572 |

OTHER PUBLICATIONS

Written Opinion dated Jul. 18, 2017 in related application No. PCT/EP2017/061652.

* cited by examiner

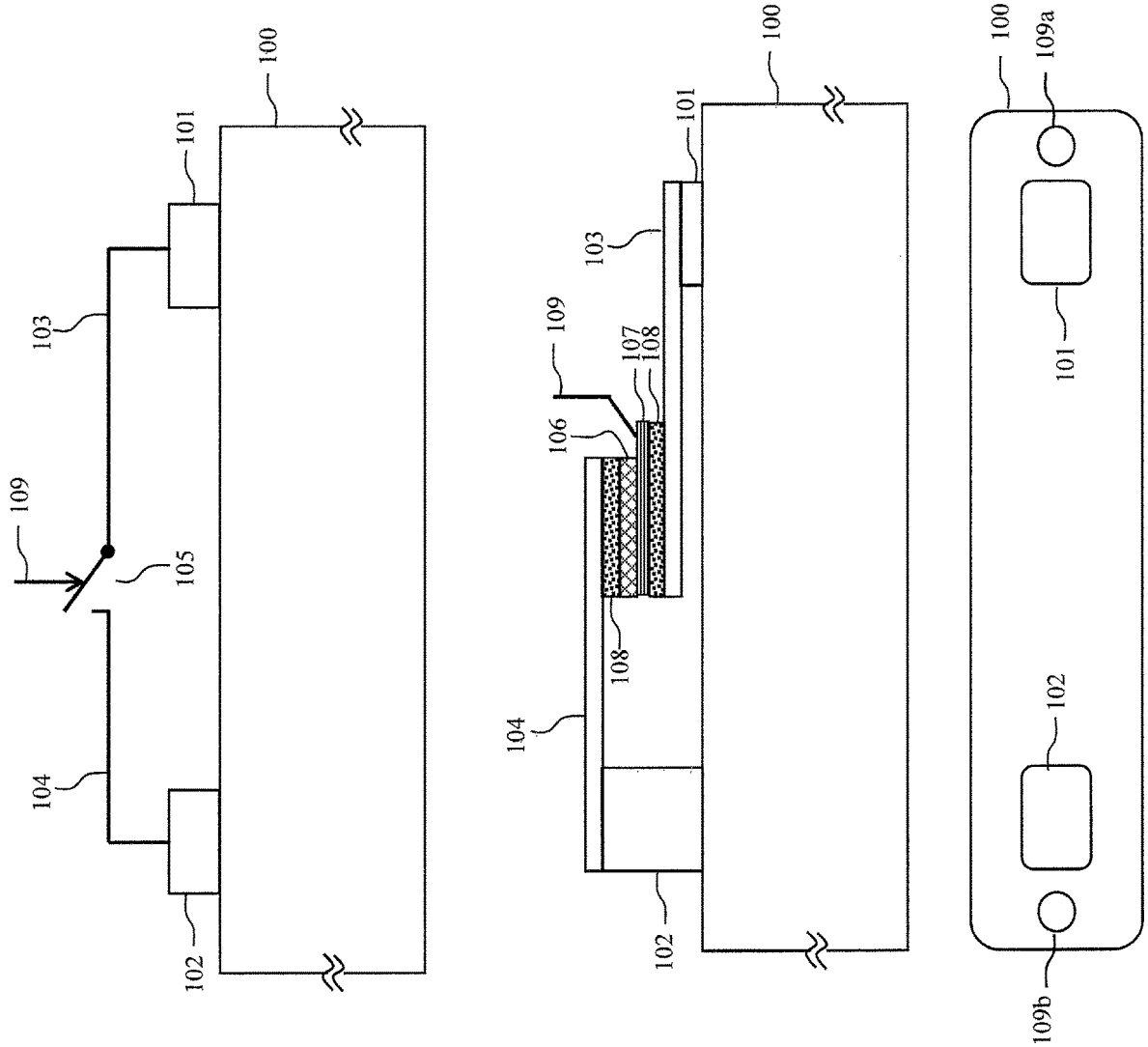

ARRANGEMENT HAVING A MULTIFUNCTIONAL CONNECTION FOR ENERGY STORAGE CELLS OR ENERGY CONSUMERS

CROSS-REFERENCE TO RELATED APPLICATION

This is a § 371 application of International patent application number PCT/EP2017/061652 filed May 16, 2017, which claims the benefit of German patent application number 10 2016 208 420.8, filed May 17, 2016, and which are incorporated herein by reference.

TECHNICAL FIELD OF APPLICATION

The present invention relates to an arrangement having a multifunctional connection for energy storage cells or energy consumers, said arrangement comprising at least a device for charge equalisation and/or a measuring device for measuring an electrical voltage of the energy storage cells or energy consumers, and an electrical bridging element having an electrical connection via which the electrical bridging element can be activated to establish an electrical connection between two electrical conductors which are insulated from one another. The invention also relates to a series circuit of multiple energy storage cells or energy consumers which are each connected using an arrangement of this type.

For safe and reliable operation of a series circuit of energy storage cells, in particular of lithium ion battery cells, bridging or bypass devices are necessary, which can electrically bridge individual cells in the series circuit in the event of a cell fault. Reliable operation also requires monitoring of the cell voltage of the individual cells and, where appropriate, a device for equalising the load states (balancing).

PRIOR ART

DE 37 21 754 A1 discloses a bridging device for protecting battery cells, which allows irreversible bridging of destroyed storage cells which have high resistance on failure. The bridging device consists of two semiconductor components arranged in series in layers and each having a different current-voltage characteristic. If a destroyed storage cell fails at high resistance, the high charge current flows through the two semiconductor components, which break down owing to the resulting sharp increase in temperature and thereby irreversibly short-circuit the storage cell in a low-resistance manner.

DE 10 2012 005 979 A1 describes an electrical bridging device for bridging defective storage cells in energy stores, in which a layer sequence having at least one electrical insulation layer and one or more reactive layer stacks, in which an exothermic reaction can be triggered, is formed between two electrical conductors. The reactive layer stack and the insulation layer are matched to each other such that the insulation layer melts as a result of the thermal energy released during the exothermic reaction, and an electrical connection is produced between the electrical conductors.

DE 10 2012 205 553 A1 describes a battery cell having device for decoupling and/or bridging connections of the battery cell. To this end, the battery cell has a mechanical fuse element which disconnects and/or short-circuits the connections of the battery cell when triggered or activated. The mechanical fuse element is triggered using an electrical trigger signal on the basis of a measurement variable sensed using a monitoring sensor. Details on the structure and wiring of the individual elements cannot be found in this document.

Until now, multiple connection lines have had to be provided for safe and reliable operation of a series circuit of energy storage cells or battery cells, in order to connect the bridging device, the measuring device for measuring the electrical voltage of the battery cell and the device for charge equalisation to the battery. However, these connection lines entail costs during production and assembly of the battery system on the one hand, and the reliability of the battery system is reduced by this large number of connection lines on the other hand. Until now, this problem has been solved by traditional methods for optimising the costs and increasing the reliability of cable harnesses and plug contacts. However, reducing the number of connections has so far always been associated with reduced functionality. However, designs in which the bridging device manages without external actuation and triggers automatically each require a sharply increased resistance of the battery cell or a broken contact. Early triggering, for instance to prevent high power losses, is not possible. Safe and reliable operation of the battery system cannot be guaranteed in every case thereby.

The object of the invention consists in specifying an arrangement having a connection for energy storage cells or energy consumers, said arrangement allowing both the actuation of a bridging device and the connection of a measuring device for measuring the electrical voltage of the energy storage cells or energy consumers and/or a device for charge equalisation, with a lower number of connection lines.

PRESENTATION OF THE INVENTION

The object is achieved with the arrangement having the multifunctional connection according to Claim 1. Claim 9 relates to a series circuit of multiple energy storage cells or energy consumers which are each connected using an arrangement of this type. Advantageous embodiments of this arrangement and of the series circuit of energy cells or energy consumers form the subject matter of the dependent claims or can be found in the following description and the exemplary embodiments.

The proposed arrangement having a multifunctional connection for energy storage cells or energy consumers comprises at least a device for charge equalisation and/or a measuring device for measuring an electrical voltage of the energy storage cells or energy consumers and an electrical bridging element having an electrical connection. Via this electrical connection, the bridging element can be triggered or activated to produce an electrical connection between two electrical conductors which are insulated from each other. The electrical connection is connected to one of the two electrical conductors in an electrically conductive manner via the bridging element. One of the two electrical conductors is connected or is connectable to a first pole in an electrically conductive manner, and the other electrical conductor is connected or connectable in an electrically conductive manner to a second pole of the energy storage cell or of the energy consumer. The device for charge equalisation and/or the measuring device are connected to the electrical connection of the bridging element and thereby to one of the two electrical conductors. The arrangement further comprises a trigger circuit for triggering or activating the electrical bridging element, said trigger circuit being connected to the electrical connection of the bridging element in parallel to the device for charge equalisation and/or the measuring device. The terms trigger and activate are used synonymously and therefore refer to the same process in the present application.

The proposed arrangement with the multifunctional connection thus allows external actuation of the bridging element, connection of the device for charge equalisation to the energy storage cell and also measurement of the cell voltage of the energy storage cell via only one connection line to the electrical connection of the bridging element. The number of connection lines is thus considerably reduced in comparison with the prior art while the functionality remains the same, allowing not only a cost saving but also operation of a corresponding series circuit of energy storage cells with a high level of safety and reliability. Comparable problems occur in series circuits of energy consumers such as lights or heating elements. The proposed arrangement can therefore also be used correspondingly with energy consumers. Different embodiments of the arrangement in connection with energy storage cells are explained below. However, these embodiments can also be implemented in the same manner in connection with energy consumers.

The bridging element is triggered by a trigger circuit. The latter is connected to the bridging element via the electrical connection. The bridging element is designed and arranged such that the electrical connection for triggering the bridging element is connected in an electrically conductive manner via the bridging element to one of the two electrical conductors and thus to one of the two poles or power connections of the energy storage cell or battery cell. The bridging element can be triggered for example by switching on a trigger current through the trigger circuit. Thanks to the conductive connection of the electrical connection to one of the two poles of the energy storage cell, this electrical connection, also referred to below as multifunctional connection, can be used to measure the voltages of the series-connected storage cells. At the same time, the electrical connection can also be used to connect a device for charge equalisation, also referred to as a balancing circuit, to the energy storage cell. This also applies to the energy storage cells in a series circuit of similar energy storage cells.

In an advantageous embodiment, the bridging element has between the two electrical conductors a layer sequence having at least one electrical insulation layer, which insulates the two electrical conductors from each other, and an electrically conductive reactive layer, in which an exothermic reaction can be triggered via an electrical connection, by means of which reaction the insulation layer at least partially melts, and an electrical connection between the electrical conductors is produced thereby. The bridging element can be designed as in DE 10 2012 005 979 A1. One of the two electrical conductors is preferably connected in an electrically conductive manner to the reactive layer from which the electrical connection of the bridging element emanates. Since the reactive layer is electrically conductive, the electrical connection of the electrical connection to this electrical conductor and thus to a pole of the storage cell is produced thereby. The individual layers of the bridging element do not necessarily have to be integrally joined to one another but can also merely rest on one another. The proposed arrangement exploits the fact that a current flow of a certain characteristic is necessary to trigger the exothermic reaction in a reactive layer, for example a steep current gradient which does not occur during measurement of the cell voltage with a corresponding measuring device or during use of a device for charge equalisation. Therefore, these devices cannot trigger the reactive layer, and therefore the electrical connection of the bridging element can also be used by these devices. The bridging element can also be designed such that the exothermic reactions of the reactive layer are triggered by a sufficiently high current flow as the current flow of a certain characteristic, for example by means of local heat generation at a transfer resistance or at a heating resistor. In this case too, the current flows required for this are achieved neither by the measuring device for measuring the cell voltage nor by the device for charge equalisation.

The trigger circuit is therefore preferably designed such that it generates a corresponding current flow or current gradient at the reactive layer via the electrical connection. To do this, the trigger circuit is preferably connected to a suitable reference potential so that the current flow between the reference potential and the electrical connection takes place at the transfer element. In a series circuit of energy storage cells, the highest or lowest potential of this series circuit can be used as the reference potential. A specially selected potential within the series circuit can also be used for this.

An example of a reactive layer is a reactive nanofoil, for example a reactive Ni—Al foil, as is known for example from WO 01/83182 A1. Such nanofoils are composed of a large number of nanolayers, for example with layer thicknesses within the range of 1 nm to 500 nm; generally, layers of two different materials alternate and react exothermically with each other on input of a suitable amount of energy. Other reactive layers can also be used in the proposed bridging element, for example layers of nanothermite or other exothermically reactive materials.

The bridging element can also use another mechanism to connect the two electrical conductors electrically. The mechanism must be selected such that the bridging element is again triggered by a current flow of a certain characteristic which does not occur as a result of the operation of the device for charge equalisation and/or the measuring device via the electrical connection.

Preferably, the device for charge equalisation (balancing circuit) is designed such that the charge equalisation takes place by discharging the storage cell in question via a resistor (passive balancing). There is also the possibility of designing the trigger circuit such that it represents the extension of a passive balancing circuit by a low-resistance possibility for bridging the discharge resistor, for example with a MOSFET parallel to the discharge resistor. Furthermore, in a series circuit of energy storage cells there is also the possibility of designing the balancing circuit such that the charge equalisation takes place by redistributing the charge to other storage cells via a corresponding connection network (active balancing). In this case, the trigger circuit must be designed such that it is an extension of the active balancing circuit by a possibility for switching off the current limitation.

The energy storage cells can also have a device for interrupting the current path, also known by the abbreviation CID (current interrupt device). In a series circuit, one or more interruptions of the series circuit, which are caused for example by one or more CIDs, can then also be bridged with the bridging elements of the arrangements.

The trigger circuit of the proposed arrangement can also be interconnected in a series circuit of energy storage cells such that it draws the energy necessary to trigger the bridging element, for example to ignite the reactive layer of a correspondingly constructed bridging element, from at least one other energy storage cell of the series circuit. This can take place for example by means of what is known as a flying capacitor or switched capacitor or bootstrap circuit.

The multifunctional connection of the proposed arrangement can be used to trigger a bridging element and at the same time as a contact for cell voltage measurement and as a connection for a balancing circuit. Only one connection line to the energy storage cell is necessary for this. The number of connection lines and connections for safe and reliable operation of a series circuit of energy storage cells is thus considerably reduced in comparison with the prior art. Firstly, this increases the reliability of the overall system, since connections, plugs and cables are a known weak point, in particular in mobile applications (owing to vibrations). Secondly, the costs for production and assembly of the battery system in question can be reduced thanks to the reduced number of connections. The proposed arrangement can be used for all fields in which corresponding electrical bridging elements are used and in which at least a cell voltage must also be measured, for example in batteries or fuel cells.

BRIEF DESCRIPTION OF THE DRAWINGS

The proposed arrangement with the multifunctional connection is explained again in more detail below using exemplary embodiments in conjunction with the drawings. In the figures:

FIG. 1 shows a schematic diagram of a battery storage cell having a bridging element used in the present invention;

FIG. 2 shows a more detailed diagram of an exemplary embodiment of the bridging element according to the present invention;

FIG. 3b shows an example of a trigger circuit for low-resistance bridging of the discharge resistor of the device of FIG. 3a;

WAYS OF REALISING THE INVENTION

Figure 3:
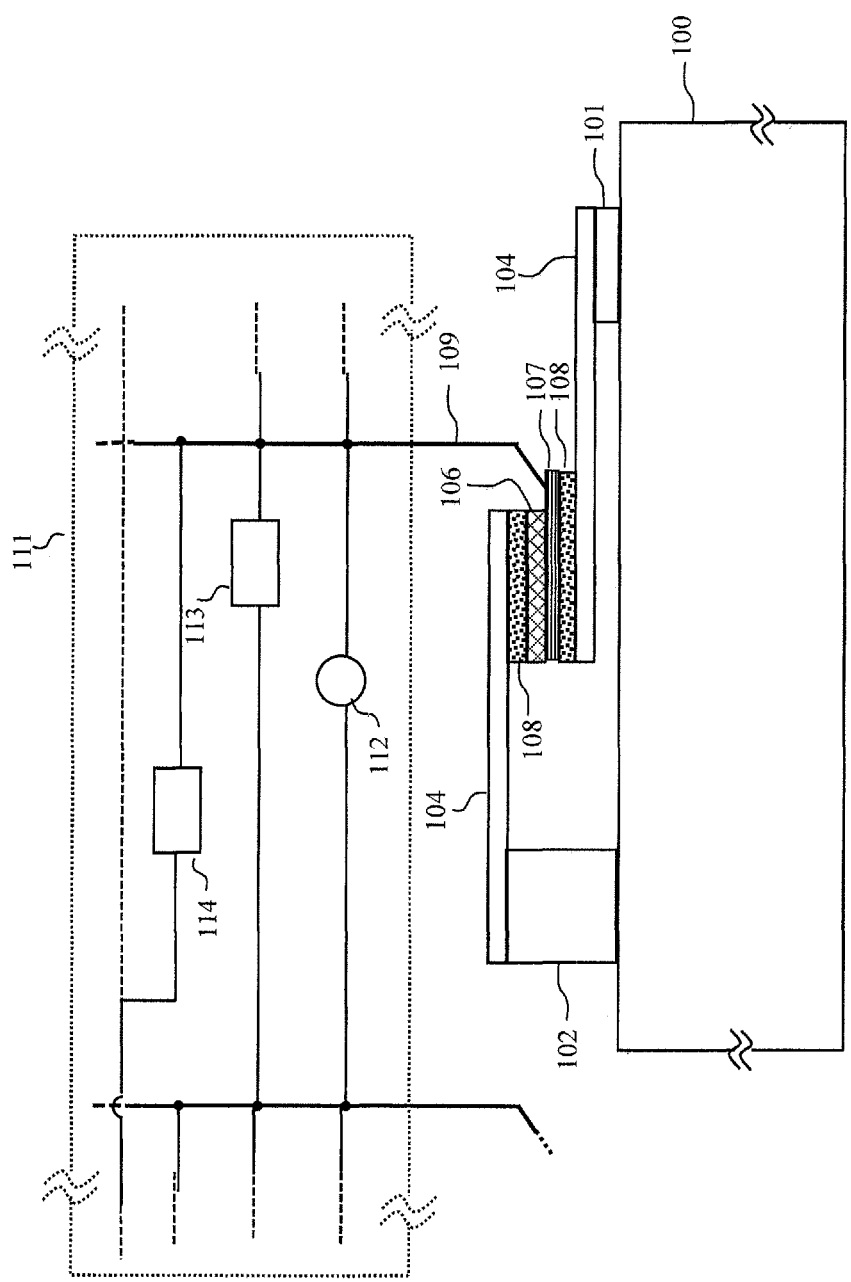
FIG. 3 shows an example of an embodiment of the proposed arrangement with the multifunctional connection to a battery cell.

In the proposed arrangement with the multifunctional connection, a bridging element is used to electrically bridge a defective battery cell, which bridging element can be triggered via an electrical connection connected to the bridging element to bridge the battery cell. FIG. 1 shows a schematic diagram of an energy storage cell 100 with the two cell connections or poles 101, 102 of the battery cell. The bridging element 105 used has two electrical conductors 103, 104 which are connected to the two poles 101, 102 of the battery cell 100. The bridging element 105 is triggered via the electrical connection 109. When the bridging element 105 is triggered, an electrical connection is produced between the two electrical conductors 103, 104 of the bridging element, and the two poles 101, 102 of the battery cell 100 are short-circuited thereby.

Such a bridging element can particularly advantageously be implemented in a design as shown in cross-section in the top part of FIG. 2. The bridging element has the two electrical connections or conductors 103, 104 between which a layer sequence consisting of a solderable layer 108, a reactive layer 107, an electrical insulation layer 106 and a further solderable layer 108 is formed. The reactive layer 107 is formed from one or more reactive layer stacks, preferably in the form of one or more reactive nanofoils in which an exothermic reaction can be triggered. The insulation layer 106 is used for high-resistance insulation of the two electrical conductors 103, 104 and thus also of the two poles 101, 102 of the battery cell 100.

Triggering of the reactive layer 107 and thus of the bridging element takes place via the electrical connection 109 attached to the reactive layer. Said electrical connection is connected to a triggering device (not shown in the figure). This can be for example a current source or voltage source (for example a pre-charged capacitor). Triggering takes place by means of a current pulse or voltage pulse or else by means of a current of sufficient strength to trigger the exothermic reaction in the reactive layer 107. This reaction results in the generation of a lot of heat. The insulation layer 106 is at least partially melted by this heat. The two solder layers 108 also melt because of the intense heat generation. The insulation residues dissolve in the solder, resulting in electrical contact between the two electrical conductors 103, 104 and thus electrical bridging of the battery cell 100.

As can be seen in FIG. 2, the electrical connection 109 is also in electrical contact with a pole 101 of the battery cell via the electrically conductive reactive layer 107 and the solder layer 108. In the present invention, this is also used to connect other devices to this pole of the battery cell via this electrical connection 109.

The bottom part of FIG. 2 schematically shows a view of the battery cell 100 with the two poles 101, 102 from above. In this diagram, a corresponding electrical connection 109a can be seen, which corresponds to the electrical connection 109 in the top part of the figure. In addition, a further electrical connection 109b is shown, which can be provided optionally and also corresponds to the electrical connection 109 of the top part of the figure. The connection 109b is connected electrically to the connection 109a and simplifies contact if battery cells are connected in series and the poles 101 and 102 are connected alternately to the neighbouring cells (structure of a battery module). When constructing multiple battery cells in series, the connections 109a and 109b make it possible always to have the multifunctional connection 109 on the same side of the module.

Figure 4:
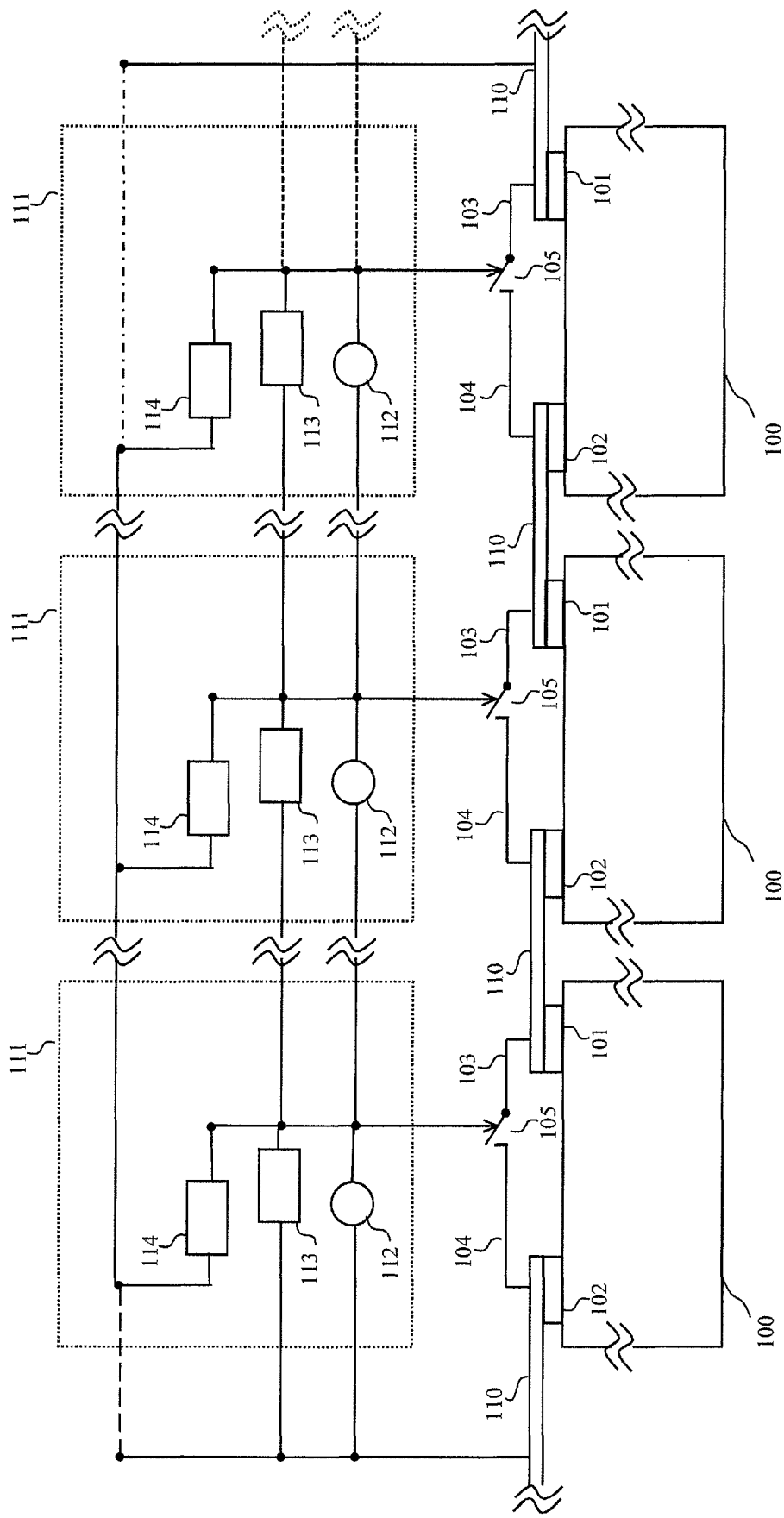
FIG. 4 shows an example of the interconnection of several of the proposed arrangements in a series circuit of battery cells.

Because the electrical connection 109 used for triggering the bridging element 105 is electrically connected to one pole of the battery cell 100, this connection can also be used for further devices which must be connected to this pole of the battery cell. This is shown by way of example and partially schematically in FIG. 3, which shows an example of the proposed arrangement. Here, in a monitoring and actuating circuit 111, a measuring device 112 for voltage measurement, a balancing circuit 113 for charge equalisation and the trigger circuit 114 for triggering the bridging element are connected to the multifunctional electrical connection 109. The trigger circuit 114 is connected to a reference potential via a connection element (busbar) 110 (cf. FIGS. 4/5). This reference potential is preferably used for all the trigger circuits 114 of a series circuit of corresponding battery cells 100. The measuring device 112 and the balancing circuit 113 are in turn connected to another potential, in the present case via the electrical connection 109 of the next bridging element to the corresponding pole 101 of the adjacent battery cell 100. This is shown schematically again in FIG. 4, which shows three series-connected battery cells 100 with the corresponding arrangements, i.e. bridging elements 105 and monitoring and actuating circuits 111. The reference potential for the trigger circuits 114 can for example relate to the top cell of a series circuit (highest voltage) or alternatively to the bottom cell of a series circuit, as is indicated in the figure with the two differently dashed passages of the upper connection line, of which only one can ever be implemented as a connection.

The trigger circuit 114 can be implemented for example by a voltage source or a current source such as a charged capacitor which, when triggered, discharges into the reactive layer of the bridging element to activate it. This can also be a transistor such as a MOSFET or a thyristor which triggers the activation current for the reactive layer.

Figure 3B:
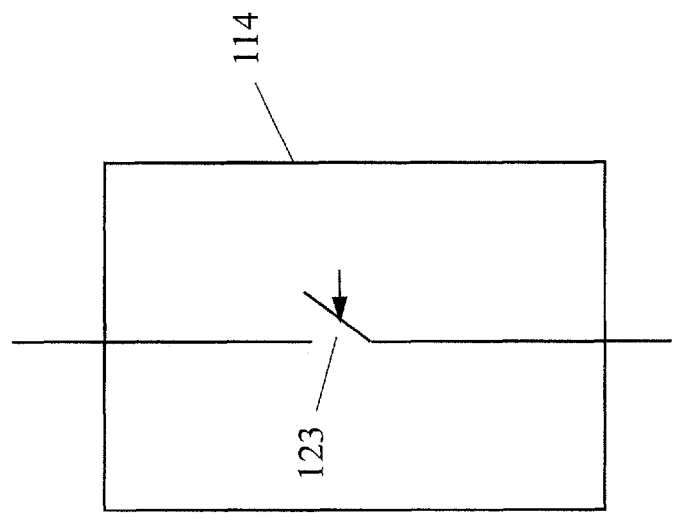
Figure 3A:
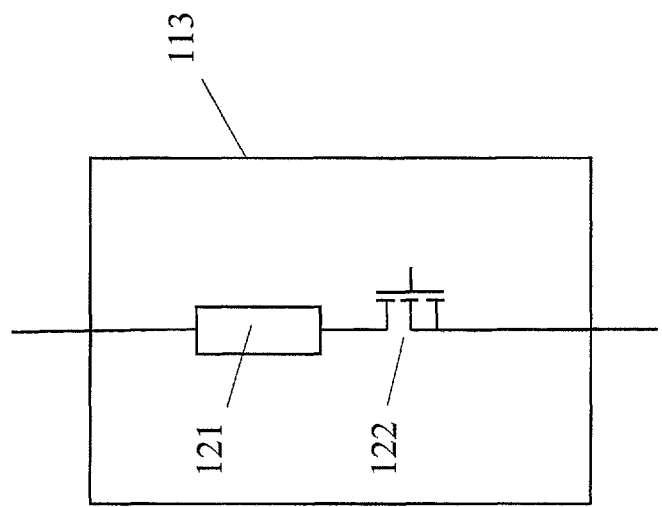
FIG. 3a shows an example of an embodiment of the device for charge equalisation.

FIG. 3a shows an example of a balancing circuit 113 in which charge equalisation takes place by discharging the respective storage cell via a discharge resistor 121. Charge equalisation is activated via a discharge switch 122. In this case, the trigger circuit 114 can be designed such that it bridges the discharge resistor 121 of the balancing circuit in a low-resistance manner to activate the bridging device with a switching device 123. A corresponding trigger circuit is shown by way of example in FIG. 3b.

Figure 5:
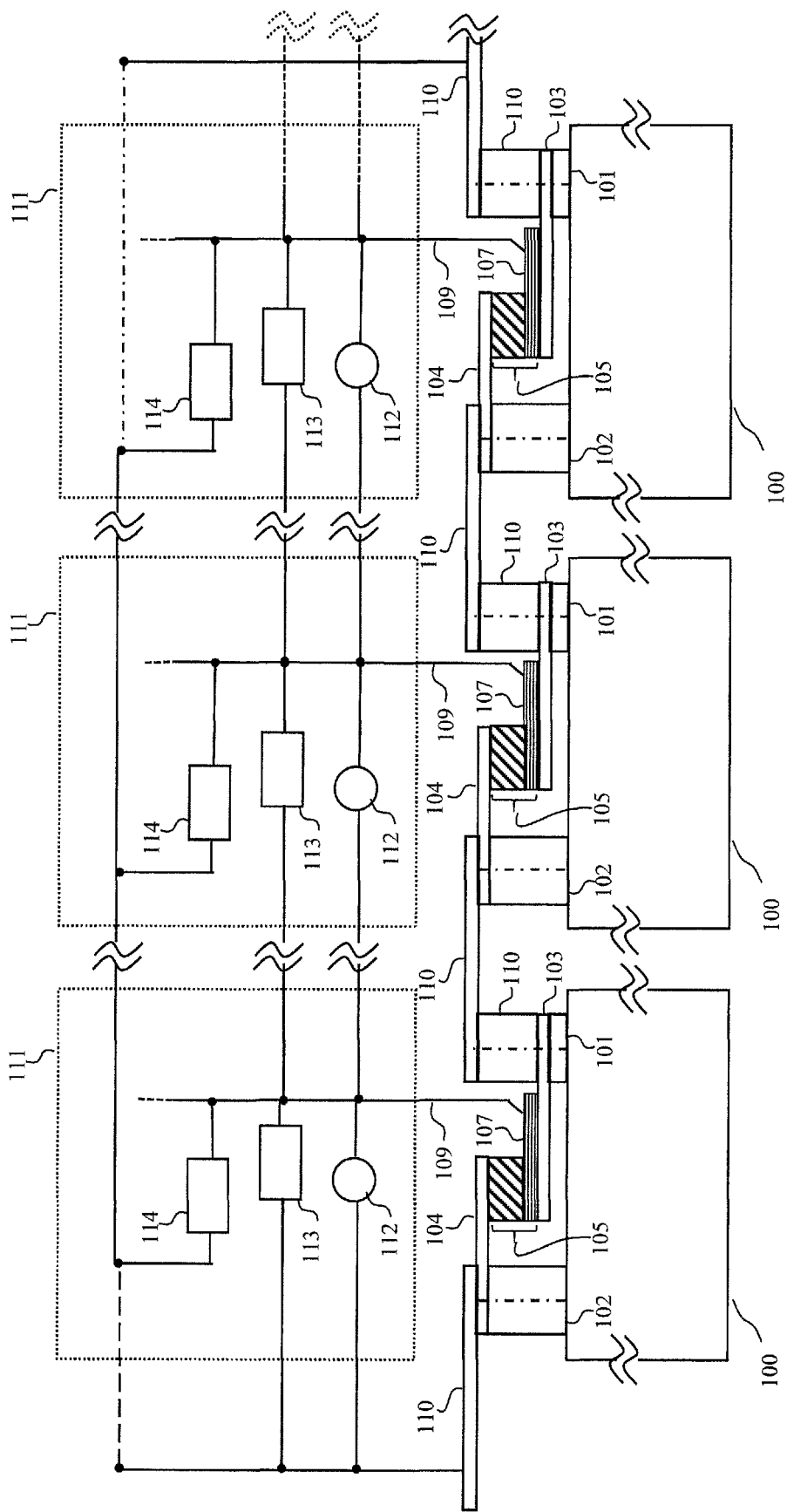
FIG. 5 shows the example of FIG. 4 with a more detailed diagram of the bridging elements used by way of example.

FIG. 5 shows this embodiment again in detailed form in which the reactive layer 107 and the electrical conductors 103, 104 of the bridging element 105 can be seen.

Figure 6:
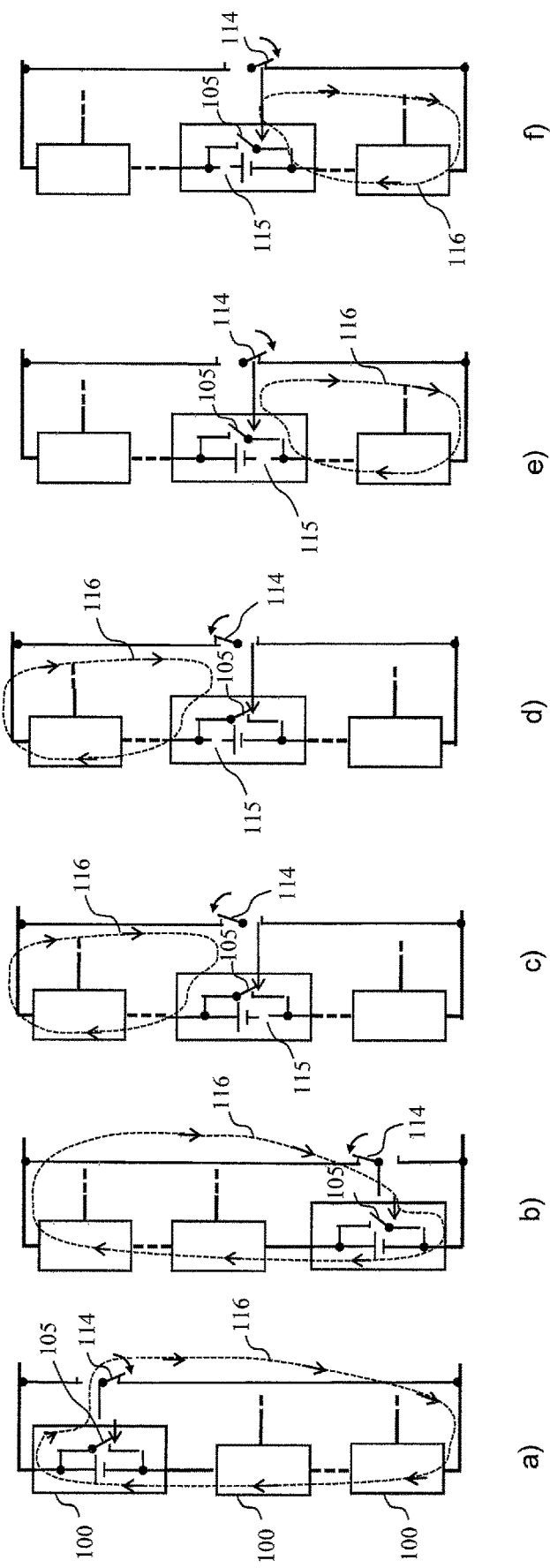
FIG. 6 shows various schematic diagrams of the current paths during triggering of the bridging element if there is a defective battery cell in a series circuit of battery cells.

FIG. 6 shows, by way of example and in a highly schematic diagram, the current paths in different fault cases using a series circuit of three battery cells 100 with the corresponding bridging elements 105. In the figure, the bridging element 105 is in each case only indicated on the battery cell on which bridging is necessary. The trigger circuit 114 is likewise merely indicated by a switch in the figures. Each battery cell 100 has the two electrical power connections or poles via which the battery cells are connected to one another in series.

Part-FIG. 6a) shows a case in which the top battery cell of the series circuit should be bridged; in this case, the potential of the bottom battery cell is used as the reference potential for the trigger circuit. The current path 116 for triggering the bridging element 105 of the top cell is indicated by the dashed line with arrows. Part-FIG. 6b) correspondingly shows an exemplary current path for triggering the bridging element 105 of the bottom cell, in which case the potential of the top cell is used as the reference potential for the trigger circuit.

The bridging element can also be used to bridge an interruption in a battery cell, for example resulting from an open CID 115, as is shown by way of example in the following part-figures. Part-FIG. 6c) shows a possibility of triggering the bridging element of the middle cell in the event of an interruption shown in the figure. In this case, the voltage of the top battery cell is used as the reference potential for the trigger circuit. In this part-figure and the ones below, the current path 116 used for triggering is again indicated with the dashed lines with the arrows. In part-FIG. 6d), the interruption is at the other pole of the middle battery cell. In this case too, the trigger circuit is again connected to the potential of the top cell as the reference potential. Part-FIGS. 6e) and 6f) show comparable cases, but in which the potential of the bottom cell is used as the reference potential.

Figure 7:
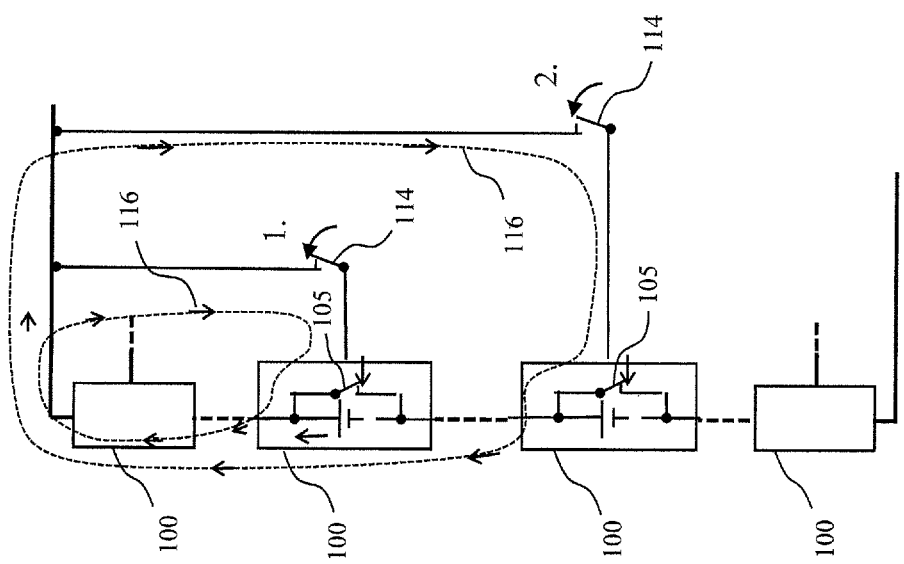
FIG. 7 shows a schematic diagram of the current paths during triggering of two bridging elements in a series circuit of battery cells.

If more than two battery cells in a series circuit fail, the individual bridging elements must be triggered successively in a suitable manner. This is illustrated by the example of FIG. 7. This figure shows the series circuit of four battery cells 100; the two middle battery cells have failed and must be bridged. In this case, both trigger circuits are connected to the potential of the top cell as the reference potential. To trigger both bridging elements, the bridging element of the cell closest to the reference potential is triggered first. The corresponding current path 116 is again shown in the figure. Then the bridging element further down in the series circuit can be triggered; the resulting current path 116 is likewise shown in the figure. If more than two battery cells in a series circuit are defective, this triggering principle is applied analogously.

Figure 8:
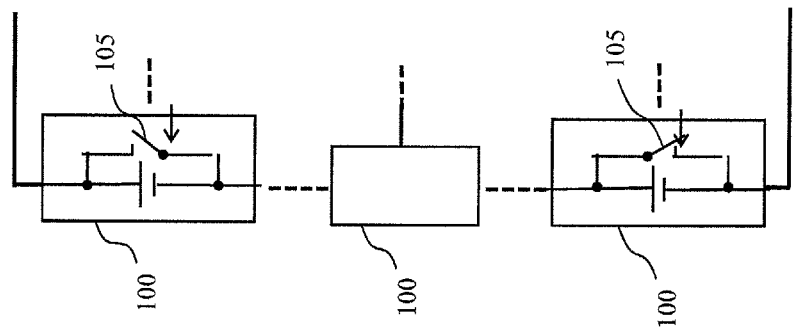
FIG. 8 shows an exemplary interconnection of the bridging elements of the top and bottom cells of a series circuit of battery cells.

Fault cases can occur which cannot be covered by simply connecting the multifunctional connection of all the battery cells to the highest or lowest potential of the series circuit to trigger the bridging elements. This applies to fault cases in the top or bottom battery cell. These problems can be avoided by connecting the electrical connection of the bridging element not to the pole with the highest potential in the case of the top cell, and not to the pole with the lowest potential in the case of the bottom cell, as is indicated schematically in FIG. 8. Alternatively, the trigger circuit can of course also be in a different form (for example by means of a pre-charged capacitor, as is the case in what is known as a flying capacitor or switched capacitor or bootstrap circuit).

LIST OF REFERENCE SYMBOLS

100 Battery cell
101 Cell connection or pole
102 Cell connection or pole
103 Electrical conductor
104 Electrical conductor
105 Bridging element
106 Insulation layer
107 Reactive layer
108 Solder layer/solder deposit
109 Electrical connection
109a Electrical connection
109b Electrical connection
110 Connection element
111 Monitoring/actuating circuit
112 Device for measuring voltage
113 Balancing circuit
114 Trigger circuit
115 CID
116 Current path
121 Discharge resistor
122 Discharge switch
123 Switching device

The invention claimed is:
1. An arrangement having a multifunctional connection for energy storage cells or energy consumers, said arrangement comprising at least
a device for charge equalisation and/or a measuring device for measuring an electrical voltage of the energy storage cells or energy consumers,
an electrical bridging element having the multifunctional connection via which the bridging element can be activated to establish an electrical connection between two electrical conductors which are insulated from one another and which is connected in an electrically conductive manner to one of the two electrical conductors via the bridging element, and a trigger circuit which is connected to the multifunctional connection, for triggering the bridging element, wherein a first of the electrical conductors is connected or connectable in an electrically conductive manner to a first pole of an energy storage cell or energy consumer, and a second of the electrical conductors is connected or connectable in an electrically conductive manner to a second pole of the energy storage cell or energy consumer, and the device for charge equalisation and/or the measuring device is connected to the multifunctional connection of the bridging element.

2. The arrangement according to claim 1, characterised in that the bridging element has between the two electrical conductors a layer sequence having at least one electrical insulation layer, which insulates the two electrical conductors from each other, and an electrically conductive reactive layer, in which an exothermic reaction can be triggered via the multifunctional connection, by means of which reaction the insulation layer at least partially melts, and the electrically conductive connection between the electrical conductors is produced.

3. The arrangement according to claim 2, characterised in that one of the two electrical conductors is connected in an electrically conductive manner to the reactive layer, and the electrical connection is formed at the reactive layer.

4. The arrangement according to claim 2, characterised in that the layer sequence also has one or more electrically conductive solder layers, which melt as a result of the exothermic reaction in the reactive layer and produce a solder connection between the two electrical conductors.

5. The arrangement according to claim 1, characterised in that the bridging element is designed such that it can be activated via the multifunctional connection by a current flow of a certain characteristic.

6. The arrangement according to claim 5, characterised in that the characteristic is selected such that a current flow having this characteristic is not generated via the multifunctional connection by the operation of the device for charge equalisation and/or the measuring device.

7. The arrangement according to claim 1, characterised in that the device for charge equalisation is designed such that the charge equalisation takes place by discharging the energy storage cell via a discharge resistor.

8. The arrangement according to claim 7, characterised in that the trigger circuit is formed by a switching device for low-resistance bridging of the discharge resistor of the device for charge equalisation.

9. A series circuit of multiple energy storage cells or energy consumers which are each connected to an arrangement according to claim 1.

10. The series circuit according to claim 9, in which the trigger circuit of each arrangement is connected to a reference potential which is derived from one of the energy storage cells or energy consumers of the series circuit.

11. The series circuit according to claim 10, in which the reference potential is the highest or the lowest potential of the series circuit.

12. The series circuit according to claim 9, in which the device for charge equalisation is in the form of an active charge equalisation circuit.

13. The series circuit according to claim 12, in which the trigger circuit is formed by a switching device for low-resistance bridging of a component or sub-circuit for current limitation which is used in the charge equalisation circuit.

14. The series circuit according to claim 9, in which the trigger circuit is designed and interconnected such that it draws energy required for triggering the bridging element from at least one of the other energy storage cells of the series circuit.

15. The series circuit according to claim 9, in which the multifunctional connection of the bridging element is designed as a part of an electrical connection element (busbar) which connects poles of different energy storage cells or energy consumers of the series circuit to one another.

* * * * *